(12) United States Patent
Helberg

(10) Patent No.: US 8,906,340 B2
(45) Date of Patent: Dec. 9, 2014

(54) PURIFICATION OF TICL$_4$ THROUGH THE PRODUCTION OF NEW CO-PRODUCTS

(75) Inventor: Lisa Edith Helberg, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/980,581

(22) PCT Filed: Feb. 22, 2012

(86) PCT No.: PCT/US2012/026193
§ 371 (c)(1),
(2), (4) Date: Jul. 19, 2013

(87) PCT Pub. No.: WO2012/116118
PCT Pub. Date: Aug. 30, 2012

(65) Prior Publication Data
US 2013/0302227 A1   Nov. 14, 2013

Related U.S. Application Data

(60) Provisional application No. 61/445,801, filed on Feb. 23, 2011.

(51) Int. Cl.
*C01G 23/00* (2006.01)
*C01G 23/02* (2006.01)
*C22B 34/12* (2006.01)

(52) U.S. Cl.
CPC .......... *C22B 34/1259* (2013.01); *C01G 23/024* (2013.01); *C01P 2006/80* (2013.01)

USPC ................ 423/492; 423/62; 423/87; 423/494

(58) Field of Classification Search
None
See application file for complete search history.

(56) References Cited

U.S. PATENT DOCUMENTS

| 2,370,525 A | * | 2/1945 | De Witt ........................... 423/83 |
| 2,416,191 A | | 2/1947 | Meister |
| 2,560,424 A | | 7/1951 | Epenschied |
| 2,958,574 A | | 11/1960 | Hansley et al. |
| 4,783,324 A | * | 11/1988 | Walters et al. .................. 423/70 |
| 7,368,096 B2 | | 5/2008 | Gu et al. |
| 2002/0179427 A1 | * | 12/2002 | Goddard et al. ................ 203/29 |

FOREIGN PATENT DOCUMENTS

| EP | 170640 | 5/1986 |
| GB | 732941 | 6/1955 |
| GB | 1301700 | 7/1971 |
| JP | 08198608 | 8/1996 |
| WO | 02/094409 | 11/2002 |

OTHER PUBLICATIONS

International Search Report, PCT/US2012/026193, Apr. 16, 2012.

* cited by examiner

*Primary Examiner* — Steven Bos

(57) ABSTRACT

The present disclosure relates to reacting tin metal with crude TiCl$_4$ containing arsenic to produce pure TiCl$_4$, SnCl$_4$, and an arsenic solid co-product. In some embodiments, the contaminant vanadium is removed as well. The reaction is preferably done in a continuous fashion in two stages for maximum through-put and utility at an elevated temperature. Distillation can be used to purify the TiCl$_4$ produced and simultaneously yield a purified SnCl$_4$ product. The synthesis of SnCl$_4$ in this method utilizes waste chloride to save virgin chlorine which would otherwise be used.

16 Claims, No Drawings

PURIFICATION OF TICL₄ THROUGH THE PRODUCTION OF NEW CO-PRODUCTS

This application claims the benefit of U.S. Provisional Application No. 61/445,801, filed Feb. 23, 2011, which is incorporated by reference in its entirety.

FIELD OF THE INVENTION

This invention relates to a process for purifying $TiCl_4$ produced via a chloride process.

BACKGROUND OF THE INVENTION

Pigmentary $TiO_2$ is commercially produced through the sulfate or the chloride process. The chloride process is also used to produce $TiCl_4$ for titanium metal production. In the chloride process, titanoferrous ore is carbochlorinated to produce $TiCl_4$ and a range of other metal chlorides from the ore impurities. The crude $TiCl_4$ produced in the carbochlorination is processed with a series of physical separation steps to produce a usable $TiCl_4$ product. One contaminating element found in titanoferrous ore is arsenic. The chlorination of the arsenic species present in the ore produces $AsCl_3$. $AsCl_3$ has a boiling point very similar to that of $TiCl_4$, making removal more problematic.

Different ores can contain significantly different levels of arsenic ranging from non-detectable to greater than 100 ppm. Standard purification methods for the chloride process involve first removing solids chlorides and then removing vanadium in a separate step. $AsCl_3$ is a liquid, so it is not removed by the solids removal steps. Known vanadium removal steps such as organic treating agents, like plant and animal oils, soaps, fats and waxes, do not react with $AsCl_3$. Another known commercial process is using elemental copper to remove vanadium from crude $TiCl_4$. Copper also shows no reactivity to $AsCl_3$. As a result, all of the $AsCl_3$ that forms from chlorination is present in the pure $TiCl_4$ sent to oxidation and can end up in the $TiO_2$ product. High levels of arsenic are undesirable in $TiO_2$ pigment. Pigmentary $TiO_2$ used in FDA products such as cosmetics require <1 ppm arsenic by the FDA method. Low levels are also desired in other pigmentary application such as some plastics and coatings products. Arsenic levels in $TiCl_4$ used to produce titanium metal must also be kept low to avoid deformations in the final metal pieces. Typical levels for $TiCl_4$ for titanium metal are <10 ppm arsenic.

Since $AsCl_3$ passes through all the known vanadium removal processes, such as organic treatment or copper metal, all the $AsCl_3$ will end up in the purified $TiCl_4$. If high concentrations of arsenic were present in the ore, elevated levels of $AsCl_3$ will also be present. Two technologies are known to remove $AsCl_3$ from pure $TiCl_4$. If a partial reduction of the concentration from, for example, 100 ppm to 10 ppm is all that is required, distillation can be used with effective production of the desired product, but a significant yield loss of $TiCl_4$ is also required. Lower concentrations can also be achieved at greater penalties for energy consumption and equipment sizing. $AsCl_3$ has little commercial value. Arsenic is currently only used in a few specific applications, and each of these requires a high purity level, such as gallium arsenide production. As a result, using distillation of produce a highly concentrated $AsCl_3$ product would reduce the yield loss of $TiCl_4$ but would not yield a useful product. The $AsCl_3/TiCl_4$ stream would need disposal in a proper manner. Since the boiling points of $AsCl_3$ and $TiCl_4$ are so close, only 6° C. apart, a large amount of energy would be required to produce this waste stream.

Another potential method for removing $AsCl_3$ from purified $TiCl_4$ is to use carbon adsorption. This method does not work on crude $TiCl_4$. Carbon adsorption can remove the $AsCl_3$ to very low levels that would be suitable for all applications including cosmetics. However, the carbon adsorption is not selective for only $AsCl_3$. Many other species are present in the pure $TiCl_4$ such as the sulfur gases produced from the carbochlorination, like $SO_2$, COS, and $CS_2$. These species will adsorb competitively on to the carbon, limiting the capacity. As a result, this method is not commercially viable for large scale production such as pigmentary $TiO_2$ for large markets like plastics and coatings.

Thus, the problem to be solved is removal of $AsCl_3$ from $TiCl_4$ produced via the chloride process in an economical, efficient, and safe manner.

SUMMARY OF THE INVENTION

Applicants have solved the aforementioned problems by using tin metal to remove arsenic from crude $TiCl_4$ produced via the chloride process.

One aspect is for a process for the purification of $TiCl_4$ comprising contacting arsenic-containing crude $TiCl_4$ with tin to produce purified $TiCl_4$, $SnCl_4$, and solid arsenic and separating the solid arsenic from the purified $TiCl_4$ and $SnCl_4$. In some aspects, the contacting and separating steps are performed by a two stage process comprising reducing the arsenic content in the arsenic-containing crude $TiCl_4$ by contacting the arsenic-containing crude $TiCl_4$ with a less than excess amount of tin to produce partially purified $TiCl_4$, $SnCl_4$, and solid arsenic; separating the solid arsenic from the partially purified $TiCl_4$ and $SnCl_4$; further reducing the arsenic content in the partially purified $TiCl_4$ by contacting the partially purified $TiCl_4$ with an excess of tin to produce purified $TiCl_4$, $SnCl_4$, solid arsenic, and excess tin; and separating the solid arsenic and excess tin from the purified $TiCl_4$ and $SnCl_4$.

Another aspect is for a process for the purification of $TiCl_4$ comprising contacting arsenic- and vanadium-containing crude $TiCl_4$ with tin to produce purified $TiCl_4$, $SnCl_4$, solid arsenic, and solid vanadium and separating the solid arsenic and solid vanadium from the purified $TiCl_4$ and $SnCl_4$. In some aspects, the contacting and separating steps are performed by a two stage process comprising reducing the arsenic and vanadium content in the arsenic- and vanadium-containing crude $TiCl_4$ by contacting the arsenic- and vanadium-containing crude $TiCl_4$ with a less than excess amount of tin to produce partially purified $TiCl_4$, $SnCl_4$, solid arsenic, and solid vanadium; separating the solid arsenic and the solid vanadium from the partially purified $TiCl_4$ and $SnCl_4$; further reducing the arsenic and vanadium content in the partially purified $TiCl_4$ by contacting the partially purified $TiCl_4$ with an excess of tin to produce purified $TiCl_4$, $SnCl_4$, solid arsenic, solid vanadium, and excess tin; and separating the solid arsenic and the solid vanadium and excess tin from the purified $TiCl_4$ and $SnCl_4$.

Other objects and advantages will become apparent to those skilled in the art upon reference to the detailed description that hereinafter follows.

DETAILED DESCRIPTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When tin metal is reacted with the arsenic in the crude $TiCl_4$ (i.e., titanium tetrachloride produced by a chloride process, which has been subjected to partial purification procedures to remove some metal chlorides), a solid arsenic product is produced along with $SnCl_4$. This treatment process works with all ranges of arsenic seen in the variety of ores available with levels from 10 ppm to 100 ppm arsenic but has not been seen to have any limitations either with lower or higher concentrations. $SnCl_4$ is a liquid, not a solid like copper chloride. As a result, the $SnCl_4$ does not contaminate the arsenic solid. Tin metal, being a milder reducing agent, also does not appear to react with $TiCl_4$, unlike copper metal. As a result, a simple two stage reactor system can be used with tin powder with essentially no extra yield loss of $TiCl_4$ or tin through reaction with the purified $TiCl_4$. By the term "purified $TiCl_4$," it is meant that the concentration of the arsenic in the $TiCl_4$ is at least significantly lowered if not reduced to a level below that which can be detected by known analytical techniques. The product $TiCl_4$ has arsenic removed to a level suitable for use in the production of $TiO_2$ or titanium metal. The $TiO_2$ may be suitable for use in applications where lower arsenic concentrations are desired.

In the step of contacting the crude $TiCl_4$ with the tin material, the tin can be added to the $TiCl_4$ by any suitable addition or mixing method. The tin can be added as a fine powder using known engineering methods such as a star valve or screw feeder with appropriate consideration made for controlling $TiCl_4$ vapors back flowing into the system. Mixing of the tin powder with the crude $TiCl_4$ may be done with agitation such as paddle mixer, sparging, or other engineering methods appropriate for the difficulties associated with handling $TiCl_4$. In some embodiments, the amount of tin added to the crude $TiCl_4$ is an excess amount. For a given equipment size and temperature, the rate of the reaction will be adjusted by the amount of excess tin added. When a single stage configuration is used, excess amounts could be very high, such as 20 times excess. A two stage configuration allows less excess to be used in the final stage, and lower amounts such as eight times excess can be used. The excess used in the final stage is also utilized later in the first stage.

$SnCl_4$ can be separated from the resulting pure $TiCl_4$ through, for example, distillation. $SnCl_4$ is a valuable product used as a catalyst and the starting material for the production of organometallic tin compounds that are used in a wide variety of applications. So, in this process, a valuable co-product is produced, and many other technical problems are eliminated.

First, by converting liquid $AsCl_3$ into a solid, disposal of the arsenic atoms becomes much easier. Liquid $AsCl_3$ is a water reactive, corrosive material that releases HCl upon contact with atmospheric moisture. As such, it cannot be disposed of directly. If it was removed from the product $TiCl_4$ stream through distillation, it would be mixed with larger concentrations of $TiCl_4$, which is also a water reactive, corrosive material that releases HCl upon contact with atmospheric moisture, and both liquids would need to be converted into a different product before disposal. By converting the $AsCl_3$ into a solid as part of the removal process and then separating all of the $TiCl_4$ from the solid, a less hazardous material is produced. The residual solid is not contaminated with treating agent such as copper chloride or organic residue that must be separated since $SnCl_4$ was formed and already separated. This separation also produces a much small stream to handle. This stream might be much easier to convert into an acceptable form for landfill or other appropriate disposal.

Second, while a distillation step would still be required to recover $SnCl_4$, the energy intensity would be lower to produce the $TiCl_4$ product. For $TiO_2$ production in the chloride process, significantly higher concentrations of $SnCl_4$ are allowed in the $TiCl_4$ since the Sn does not end up incorporated into the final $TiO_2$ product. So, the initial separation where a lower $SnCl_4$- and much lower $AsCl_3$-containing $TiCl_4$ product is produced from the bottom of the distillation column, would experience two benefits: (1) an increase in the separation of the boiling points of the two species being separated and (2) an increase in the amount of tolerated contamination in the product $TiCl_4$. So, for example, a starting crude $TiCl_4$ with 100 ppm As might have to be distilled to reduce the arsenic level to 10 ppm As. With a 6° C. difference in the boiling points, 130° C. for $AsCl_3$ and 136° C. for $TiCl_4$, a large column with many trays and considerable energy input would be required. If this process were used on the crude $TiCl_4$ to reduce the $AsCl_3$ from 100 ppm to 10 ppm As, then the only extra energy input required would be to reduce the $SnCl_4$ concentration. Some $SnCl_4$ is present in crude $TiCl_4$ to start due to the ore composition. As a result, the $SnCl_4$ concentration might need to be reduced from 2000 ppm to 1000 ppm in the product $TiCl_4$; however, that reduction is much easier to achieve, plus a 22° C. difference in the boiling points exists between the 114° C. for $SnCl_4$ and 136° C. for $TiCl_4$. Now the extra energy can be applied to converting the high $SnCl_4$ material into a suitable product.

Third, a valuable product is produced in the reaction instead of material with disposal issues. $SnCl_4$ is typically made through the reaction of tin metal and chlorine at elevated temperatures. In this reaction, instead of using virgin chlorine, the chloride ligand is obtained in the purification process. These chlorine ligands would be lost, for example through the copper chloride disposal in other systems. In this case, the chloride, an expensive and energy intensive reagent, is conserved instead of lost.

Fourth, no opportunity for undesirable production of Persistent Bio-accumulative and Toxic (PBT) organic compounds exists because no carbon is introduced into the system. When organic treating agents are used, the combination of heat, chlorine and carbon can under some conditions produce PBTs such as chlorinated dioxins and furans.

Finally, tin provides an opportunity to simultaneously remove both vanadium and arsenic in one unit operation. Using carbon adsorption to remove the arsenic would first require a traditional purification step such as organic treating agents, followed by a separate unit operation for the arsenic removal. If very low $AsCl_3$ levels were required, such as <1 ppm As, and low levels of $SnCl_4$ were also required, a distillation column might also be required to meet the final product specifications.

In some embodiments, the $SnCl_4$ is subsequently recovered from the $TiCl_4$. This separation can be accomplished through, for example, distillation. All of the $SnCl_4$ does not need to be removed from the $TiCl_4$ for the $TiCl_4$ to be used for $TiO_2$ production. Most of the $SnCl_4$ could be recovered in this process and recycled to produce a more concentrated $SnCl_4$ stream. The concentration of $SnCl_4$ does not impact the rate of the arsenic removal step One example of the separation of $TiCl_4$ and $SnCl_4$ would involve two separate distillation columns. The first column would be fed the product from the vanadium removal stage to the upper portion of the column. $TiCl_4$ suitable for commercial use would be collected from the bottom of the first column. The purity requirements for $TiCl_4$ used for $TiO_2$ or titanium metal manufacture would determine the configuration of this column, typically set using Aspen modeling conditions or similar engineering principles. The stream collected from the top of the first column would provide the reflux flow to the first column and feed a second column. The second column would be used to produce a finished $SnCl_4$ product from the top of the column. The material from the bottom of the second column would be high in $TiCl_4$ and lower in $SnCl_4$. The bottom material would be recycled to the tank used to provide the reflux to the first column. In this manner, no $TiCl_4$ would be lost while conserving energy. The size of the columns and number of trays would be related to the total purification strategy for the crude $TiCl_4$ since that will determine the amount of $SnCl_4$ present. $SnCl_4$ can also be present in crude $TiCl_4$ due to tin oxide in the ores. The $SnCl_4$ from the crude $TiCl_4$ will also be accounted for in the distillation.

One embodiment is for crude $TiCl_4$ to be purified in two stages. In the first stage, the arsenic concentration is only partially reduced so that the tin metal reaction can be driven to completion. The solid arsenic product is separated from this stage and a liquid (or vapor) $TiCl_4$ stream containing arsenic is transferred to a second stage. This step preferably occurs at least at 100° C. More preferably, this step occurs under pressure at temperatures elevated above the boiling point of $TiCl_4$ (about 150° C. to about 200° C. range). The arsenic solids can be collected in a drying chamber, for example a drying chamber found after a purge separation (see, e.g., U.S. Pat. No. 7,368,096, incorporated herein by reference). Alternatively, they may be collected by other known engineering methods such as, for example, filtration.

In the second stage, the arsenic is removed to the desired low levels and excess tin metal is present. The excess tin metal stream (containing some arsenic solid) is removed and can be sent to the first stage for further reaction. The $TiCl_4/SnCl_4$ with no arsenic is then separated, in one embodiment in a distillation column.

Distillation may be operated in different methods depending on the end use of the $TiCl_4$. In one embodiment, the initial $TiCl_4/SnCl_4$ mixture is sent to a rough distillation column where a stream containing low enough amounts of $SnCl_4$ in $TiCl_4$ is produced from the bottom of the column and a high $SnCl_4$ stream is produced from the top of the column. The bottom stream of $TiCl_4$ can be used to produce $TiO_2$. The top stream can be sent to a polishing distillation column which is used to produce a pure $SnCl_4$ stream from the top and a rough $TiCl_4/SnCl_4$ stream from the bottom. The bottom stream from this column can be recycled back to the start of the first distillation column. Through the use of multiple distillation columns, essentially no $TiCl_4$ yield loss occurs and both a $TiCl_4$ product and $SnCl_4$ product can be produced. A third distillation column (or batch operation of the second distillation column) can be used in some embodiments to produce a $TiCl_4$ product ideal for titanium metal production. The benefit of using elemental tin compared to organic treating agents is no organic residue is present in the $TiCl_4$, which is highly detrimental to the titanium metal.

In some embodiments, the contaminant vanadium is also removed by a process described herein. The vanadium chlorination products, $VOCl_3$ or $VCl_4$, have boiling points close to that of $TiCl_4$, which makes removal problematic. When tin metal is reacted with the vanadium in the crude $TiCl_4$, a solid vanadium product is produced along with $SnCl_4$. This treatment process works with all ranges of vanadium seen in the variety of ores available with levels from 100 ppm V to 3000 ppm V but has not been seen to have any limitations either with lower or higher concentrations. As with arsenic noted above, the $SnCl_4$ does not contaminate the vanadium solid.

The product $TiCl_4$ has vanadium removed to a level suitable for use in the production of $TiO_2$ or titanium metal Additionally, vanadium can be lowered to an operator specified concentration.

Vanadium can be removed using either the one stage or two stage process described above for arsenic. The solid vanadium product that is produced by a process described herein is suitable to become a feedstock into other processes such as the production of steel.

The $TiCl_4$ product of the process described herein can be used in any application for which titanium tetrachloride is useful. The $TiCl_4$ can be used as a starting material for making titanium dioxide and derivatives thereof especially as a feedstream for the well-known chlorination and oxidation processes for making titanium dioxide.

Titanium dioxide can be suitable for use as a pigment. The majority of $TiO_2$ produced is used for this property. Common applications are in paints, paper and plastics. The $TiCl_4$ produced in this process is suitable for use in production of $TiO_2$ for all of these applications.

Titanium dioxide is useful in, for example, compounding; extrusion of sheets, films and shapes; pultrusion; coextrusion; ram extrusion; spinning; blown film; injection molding; insert molding; isostatic molding; compression molding; rotomolding; thermoforming; sputter coating; lamination; wire coating; calendaring; welding; powder coating; sintering; cosmetics; and catalysts.

Alternatively, titanium dioxide can be in the nano-size range (average particle diameter less than 100 nm), which is usually translucent or transparent. $TiO_2$ of this particle size range is typically used for non-optical properties such as photo-protection.

The $TiCl_4$ from this process is also suitable for use to produce titanium metal through any of the known commercial pathways such as the Kroll and Hunter processes. The $TiCl_4$ is also suitable for use in the production of titanium based catalysts such as organo-titanates or Ziegler-Natta type catalysts.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modification of the invention to adapt it to various uses and conditions.

Example 1

Crude $TiCl_4$ and One Stage Removal with Elemental Sn

A 100 mL aliquot of commercial crude $TiCl_4$ was added into a 250 mL reaction flask equipped with a magnetic stirrer, heating mantle, powder addition funnel and Dean Stark trap for condensate collection. The crude $TiCl_4$ contained a range of impurities including vanadium, iron and other elements including $SnCl_4$ plus 36 ppm arsenic as $AsCl_3$. The dark yellow $TiCl_4$ was mixed with 2.0 g of powdered elemental Sn (<45 micron size, Aldrich, 98.8%) and the heated to reflux. The $TiCl_4$ and Sn were refluxed together for 3 hours. All of the color was removed from the distillate. The $TiCl_4$ was then distilled from the solids. The overheads were measured to contain <1 ppm V and <5 ppm As. They also contained 2000 ppm of Sn which includes the $SnCl_4$ which was present in the crude $TiCl_4$.

Example 2

Crude $TiCl_4$ and Two Stage Removal with Elemental Sn

A 100 mL aliquot of commercial crude $TiCl_4$ was added into a 250 mL reaction flask equipped with a magnetic stirrer, heating mantle, powder addition funnel and Dean Stark trap for condensate collection. The crude $TiCl_4$ contained a range of impurities including vanadium, iron and other elements including $SnCl_4$ plus 40 ppm arsenic as $AsCl_3$. The dark yellow $TiCl_4$ was heated to 100° C. and mixed with 1.2 g of powdered elemental Sn. The $TiCl_4$ and Sn were refluxed together for 12 hours to ensure that an endpoint had been achieved. The distillate was still a strong yellow color indicating that only a portion of the vanadium was removed. Another 1.1 g of Sn was then added. The slurry was refluxed for 1 more hour. All of the color was removed from the distillate. The $TiCl_4$ was then distilled from the solids. The overheads were measured to contain <1 ppm V and <5 ppm As. They also contained 2000 ppm of Sn which includes the $SnCl_4$ which was present in the crude $TiCl_4$.

What is claimed is:

1. A process for the purification of $TiCl_4$ comprising:
   (a) contacting arsenic-containing crude $TiCl_4$ with tin; and
   (b) producing purified $TiCl_4$, $SnCl_4$, and solid arsenic.

2. The process of claim 1 comprising after step (b) the further step of separating the purified $TiCl_4$ from the $SnCl_4$.

3. The process of claim 2, wherein the step of separating the purified $TiCl_4$ from the $SnCl_4$ is performed by distillation.

4. The process of claim 2, further comprising:
   (i) reducing the arsenic content in the arsenic-containing crude $TiCl_4$ by contacting the arsenic-containing crude $TiCl_4$ with a less than excess amount of tin to produce partially purified $TiCl_4$, $SnCl_4$, and solid arsenic;
   (ii) separating the solid arsenic from the partially purified $TiCl_4$ and $SnCl_4$;
   (iii) further reducing the arsenic content in the partially purified $TiCl_4$ by contacting the partially purified $TiCl_4$ with an excess of tin to produce purified $TiCl_4$, $SnCl_4$, solid arsenic, and excess tin; and
   (iv) separating the solid arsenic and excess tin from the purified $TiCl_4$ and $SnCl_4$.

5. The process of claim 4, wherein step (i) is performed at a temperature of at least 100° C.

6. The process of claim 5, wherein step (i) is performed at a temperature in the range of at least about 150° C. to at least about 200° C.

7. The process of claim 4, wherein the solid arsenic of step (iv) is substantially free of residual treating agents.

8. The process of claim 4 comprising after step (iv) the further steps of:
   (v) recycling the solid arsenic and excess tin of step (iv) back into the arsenic-containing crude $TiCl_4$ of step (i); and
   (vi) repeating steps (i)-(iv).

9. A process for the purification of $TiCl_4$ comprising:
   (a) contacting arsenic- and vanadium-containing crude $TiCl_4$ with tin to produce purified $TiCl_4$, $SnCl_4$, solid arsenic, and solid vanadium; and
   (b) separating the solid arsenic and the solid vanadium from the purified $TiCl_4$ and $SnCl_4$.

10. The process of claim 9 comprising after step (b) the further step of separating the purified $TiCl_4$ from the $SnCl_4$.

11. The process of claim 10, wherein the step of separating the purified $TiCl_4$ from the $SnCl_4$ is performed by distillation.

12. The process of claim 9, wherein the contacting and separating steps are performed by a two stage process comprising:
   (i) reducing the arsenic and vanadium content in the arsenic- and vanadium-containing crude $TiCl_4$ by contacting the arsenic- and vanadium-containing crude $TiCl_4$ with a less than excess amount of tin to produce partially purified $TiCl_4$, $SnCl_4$, solid arsenic, and solid vanadium;
   (ii) separating the solid arsenic and the solid vanadium from the partially purified $TiCl_4$ and $SnCl_4$;
   (iii) further reducing the arsenic and vanadium content in the partially purified $TiCl_4$ by contacting the partially purified $TiCl_4$ with an excess of tin to produce purified $TiCl_4$, $SnCl_4$, solid arsenic, solid vanadium, and excess tin; and
   (iv) separating the solid arsenic and the solid vanadium and excess tin from the purified $TiCl_4$ and $SnCl_4$.

13. The process of claim 12, wherein step (i) is performed at a temperature of at least 100° C.

14. The process of claim 13, wherein step (i) is performed at a temperature in the range of at least about 150° C. to at least about 200° C.

15. The process of claim 12, wherein the solid arsenic and the solid vanadium of step (iv) is substantially free of residual treating agents.

16. The process of claim 12 comprising after step (iv) the further steps of:
   (v) recycling the solid arsenic, the solid vanadium, and excess tin of step
   (iv) back into the arsenic- and vanadium-containing crude $TiCl_4$ of step (i); and
   (vi) repeating steps (i)-(iv).

* * * * *